April 22, 1952     S. A. PAOLI     2,594,205
METHOD OF CLEANING SHRIMP
Filed Sept. 20, 1950     2 SHEETS—SHEET 1
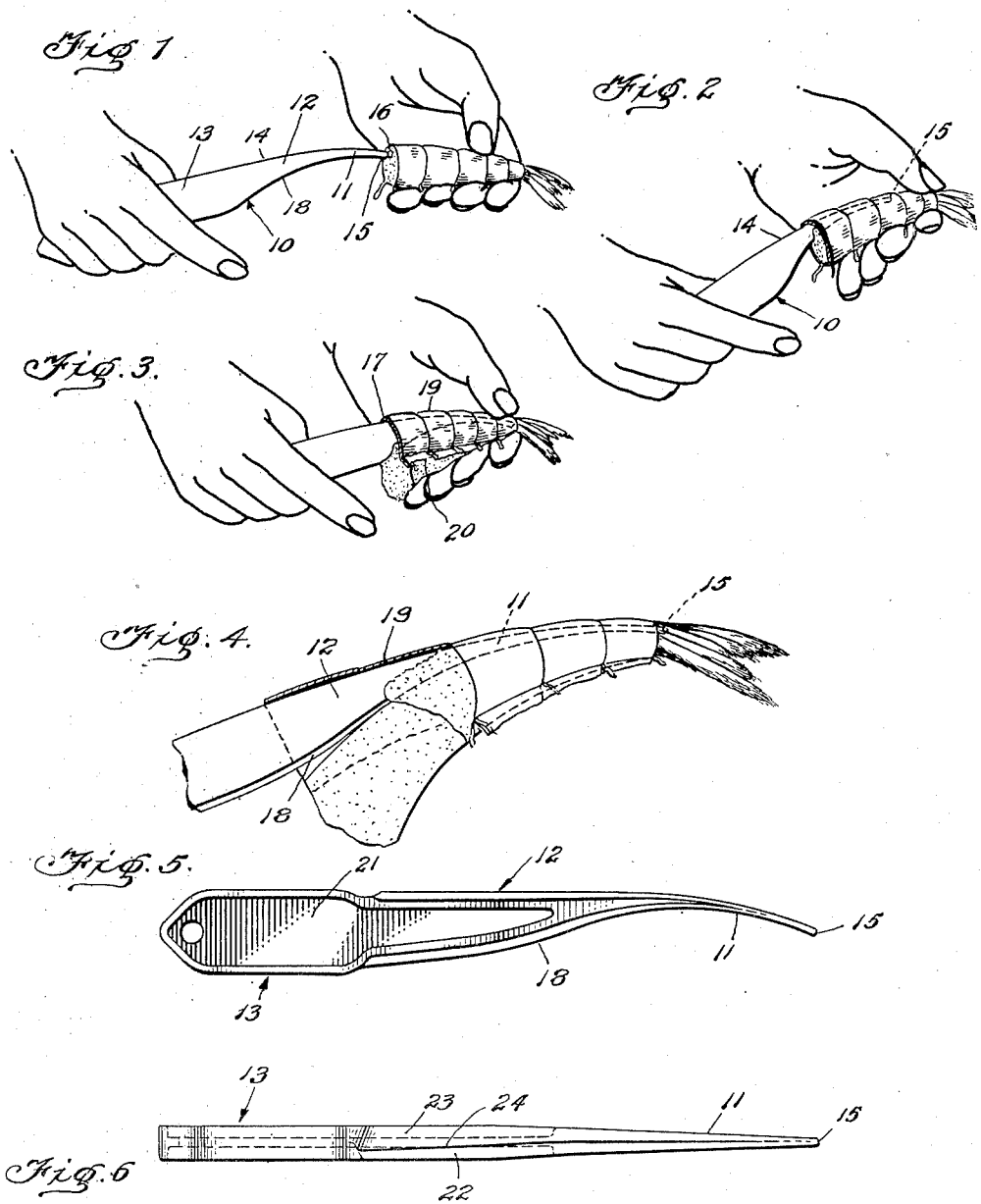
Inventor
Stephen Arthur Paoli
By McCanna and Morsbach
Attorneys

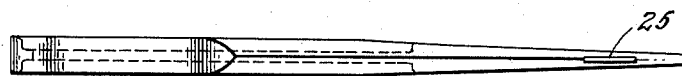
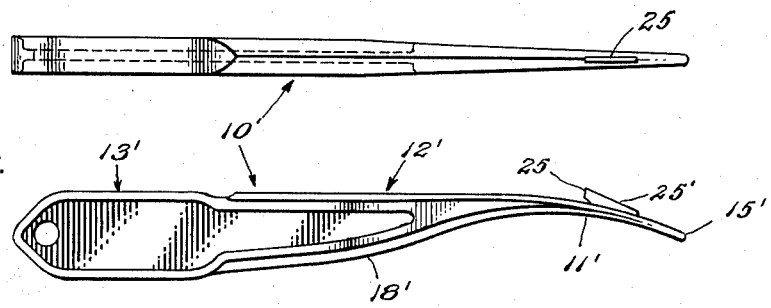
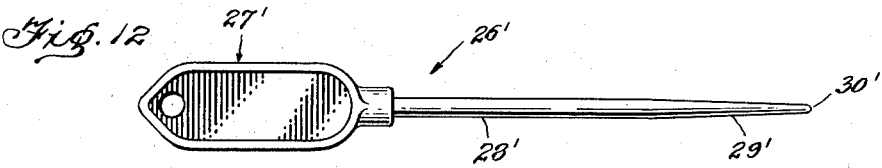
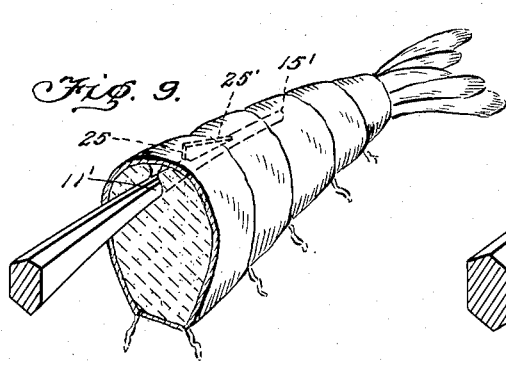
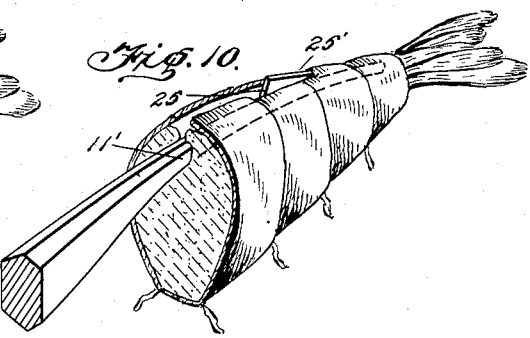
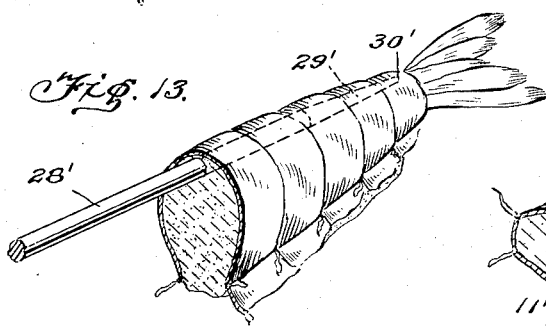
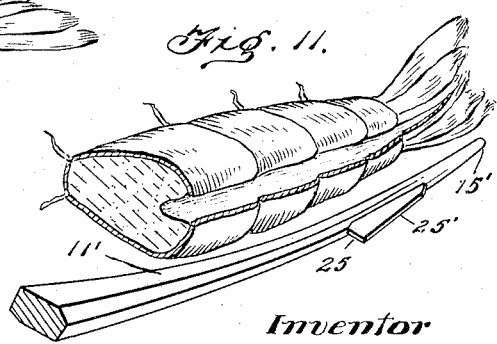

Patented Apr. 22, 1952

2,594,205

UNITED STATES PATENT OFFICE 2,594,205

METHOD OF CLEANING SHRIMP

Stephen Arthur Paoli, Rockford, Ill.

Application September 20, 1950, Serial No. 185,771

19 Claims. (Cl. 17—45)

This invention relates to a method of cleaning shrimp.

At the present time, in the marketing of shrimp the usual practice is to dehead the shrimp shortly after they are caught and then to shell the deheaded shrimp, the outer hard shell encasing the edible body of the shrimp. The above practice is generally followed whether the shrimp is fresh, canned, or sold as frozen food. As a consequence, the purchaser of a deheaded shrimp must remove the outer shell from the edible body portion of the shrimp and remove the sand vein from the body of the shrimp before the shrimp can be eaten. In general the outer shell or jacket is removed or peeled off the body of the shrimp by means of a knife or the like. After the shell is removed from the body the vein may be cut out of the body. This method of cleaning shrimp is a tedious and time consuming task.

An object of this invention is to provide a novel method of quickly and easily cleaning shrimp.

Another object of this invention is to provide a method of cleaning shrimp which includes a novel procedure of de-veining the shrimp in the same operation with removing the shrimp body from the shell.

A further specific object of this invention is to provide a method of cleaning shrimp which includes a novel procedure for severing the back of the shell of the shrimp.

A further object of this invention is to provide a novel method of cleaning shrimp which may be practiced by the use of simple tools which may be manually actuated.

Further objects and advantages of this invention will become apparent from a study of the following description.

In the drawings:

Figure 1 shows the relative positions of the shrimp cleaner and a shrimp prior to insertion of the cleaner into the shrimp;

Fig. 2 shows the shrimp cleaner inserted into the sand vein of the shrimp;

Fig. 3 shows the cleaner positioned further within the shrimp, with the wedge portion in engagement with the head end of the shrimp to force the shrimp body out of the shell;

Fig. 4 is a view, with part of the shrimp shell taken away, showing the position of the shrimp cleaner and the body of the shrimp when the shrimp cleaner is fully inserted into the shrimp;

Fig. 5 is a side view illustrating one form of the shrimp cleaner;

Fig. 6 is a corresponding bottom view of the same shrimp cleaner;

Fig. 7 is a top view of a modified form of shrimp cleaning implement having a cutting edge associated with the prong portion;

Fig. 8 is a side view of this modified form;

Fig. 9 illustrates one method of using this modified shrimp cleaning instrument;

Figs. 10 and 11 illustrate an alternate method of using the modified shrimp cleaner, in which the back of the shell is severed by the movement of the implement;

Fig. 12 illustrates another modification of the shrimp cleaning tool, and represents an extremely simple form of tool by which the present invention may be practiced, and Fig. 13 shows the novel method employing a tool of the type shown in Fig. 12.

The novel method of this invention may be performed by using an implement of the type described and claimed in my copending application, Serial No. 96,699, filed June 2, 1949, now Patent No. 2,552,450. Figs. 1 to 4 illustrate the use of this implement in performing one form of my novel method, while Figs. 5 and 6 show one form of this implement.

This implement 10 includes a prong portion 11, a wedging or camming portion 12, and a handle 13. As shown, the handle 13 forms the rear end of the implement, the prong portion forms the forward end, and the wedging portion 12 forms the central portion between the handle and the prong. The handle may be of any suitable shape that can be conveniently held. As shown in Fig. 5, a depression may be formed between the upper and lower surfaces of the implement at the handle and wedging portions to facilitate manual gripping of the tool.

The wedging portion 12 is rigidly connected to the handle and projects forwardly thereof. On the top and bottom surfaces of the wedging portion the side edges of the tool are preferably spaced relatively far apart adjacent the handle. These side edges converge at the forward end of the wedging portion where they merge with the sides of the base of the prong. The inclined bottom surface 18 of the wedging portion in effect defines a relatively wide cam surface on the bottom of the implement. The bottom surface of the implement is spaced relatively far apart from the top surface at the handle, and at the wedging portion tapers gradually toward the top surface so that at the forward end of the wedging portion the bottom surface merges smoothly with the bottom of the base of the prong. The prong portion 11 has a generally arcuate shape and extends forwardly of the wedging portion 12, tapering from its base to its extreme forward tip 15. The cross sectional shape of the prong portion 11 may assume many configurations but should be such that the prong portion may be readily inserted in the sand vein 16 of the shrimp to effect rupture of the passageway at the back of the shrimp body containing the sand vein. The length of the prong portion may vary considerably. In general, however, the prong portion should be of sufficient length so that the prong can move lengthwise of the vein to serve as a guide for the tool, so as to cause the wedging portion 12 to exert a force between the back 19 of the shell and the shrimp body 20 to wedge the body from the shell. Preferably the point 15 of the prong portion is rounded or made blunt.

As best shown in Fig. 6, the bottom inclined face 18 of the wedging portion may be formed with two transversely inclined surfaces which are asymmetrical, the narrower surface 22 having a steeper taper than the wider surface 23, and these two surfaces intersecting to form a ridge 24 which is progressively displaced from the longitudinal axis of the tool as to move away from the prong. However, if desired, the bottom inclined face may be symmetrical with respect to the longitudinal axis of the tool.

The handle, wedging portion, and prong portion may be cast as a single unit, or they may be formed as separate parts and then assembled together. Preferably the top and bottom surfaces of the respective portions merge together to provide an implement having smoothly adjoining surfaces on the prong and wedge portions. Any suitable material, such as metals and synthetic resins, may be used in the casting or molding of this shrimp cleaning implement. Also the shrimp cleaner may be formed of wood or other material, if desired. This implement may also be used in a machine in which the movements of the operator's hands are simulated by mechanical movements.

In general, the manner in which this shrimp cleaner is utilized in cleaning shrimp is shown in Figs. 1 to 4. The shrimp is normally arcuate in shape. The operator grasps the shrimp in one hand with the bottom of the shrimp facing outwardly. Simultaneously, the operator straightens the body of the shrimp. The operator thereafter grasps the shrimp cleaner in his other hand and brings the point 15 of the prong 11 into position, as shown in Figure 1, so that the point of the prong is in alignment with the sand vein 16 of the shrimp.

In Fig. 2 the hands of the operator have been moved closer together so that the shrimp cleaner and shrimp have been moved relative to each other. When this relative movement takes place, the prong 11 is inserted into the vein 16 and is moved lengthwise of the body of the shrimp. The curvature of the prong tends to facilitate the entrance and passage of the prong lengthwise of the sand vein, particularly where the body of the shrimp is not completely straightened. Preferably, the prong should be somewhat flexible in order that it may better follow the sand vein.

As further relative movement between the shrimp and the implement takes place, the wedge portion 12 is forced into the sand vein at the head end of the shrimp. When this occurs the back or side wall 17 of the body of the shrimp adjacent the sand vein is ruptured so that the top surface of the shrimp cleaner is against the back 19 of the shell of the shrimp. During this movement the inclined bottom face 18 of the wedging portion 12 forces the forward end of the shrimp body outwardly of the shell from between the sides, as shown in Fig. 3. Upon continued relative movement of the implement and the shrimp the bottom face 18 of the wedging portion moves farther lengthwise of the shrimp body and effects the complete removal of the body from the shell. Usually the shell is severed on one side immediately adjacent the feet by the wedging action of the tool, which forces the shrimp body away from the back of the shell.

In some instances the sand vein 16 will be telescoped on to the prong. The vein may be readily removed from the prong after the body of the shrimp is removed from the shell. In other instances the sand vein 16 may be ruptured when the side wall which defines the passageway containing the sand vein is ruptured, as described above. In the latter case, access to the vein may be had through the ruptured part of the body, so that the vein can be readily removed from the body of the shrimp when the shrimp are being washed.

In Figs. 7 and 8 there is shown an implement 10¹ generally similar in configuration to that shown in Figs. 5 and 6. On the prong portion 11' of this implement, spaced rearwardly from the point 15' thereof, a cutting device 25 is positioned. This cutting device preferably takes the form of a thin blade whose inclined cutting surface 25¹ tapers upwardly and rearwardly away from the prong portion 11'. This blade may be attached to the prong portion by any suitable means, and in the case of a metal implement may be formed integral with the prong portion, if desired.

In using the tool of Figs. 7 and 8 the action may be substantially similar to that in Figs. 1 to 4 if the shrimp being cleaned is relatively large. As shown in Fig. 9, in such case the blade 25 severs the meat between the back of the shell and the sand vein when the prong is inserted sufficiently far into the shrimp. Thereafter the shrimp body is forced out of the shell by the wedging action described in connection with Figs. 1 to 4. This action is illustrated in Fig. 9.

However, if the blade 25 is large enough to engage the back of the shell when the prong is inserted into the sand vein, the back of the shell will be severed along its length as the blade moves lengthwise of the shrimp. This action is illustrated in Fig. 10. In such operation the wedging action of the tool forcing the shrimp body out of the shell is not of primary importance since the shell is severed along its back by the cutting blade. The shrimp with the back of its shell severed is illustrated in Fig. 11.

It will be noted that in either operation of this implement the shrimp will be effectively deveined by the movement of the prong portion along the sand vein.

My novel method may also be accomplished by the use of a relatively simple tool 26, as shown in Fig. 12. This tool has a handle 27 which may be of any convenient shape, and an elongated rod-like portion 28 which extends from the handle and terminates in a free end 29 which preferably has a rounded or blunt tip 30. In the use of a tool of this type, the tip 30 is inserted in the body of the shrimp at the sand vein and the tip is caused to move along the sand vein. Since the rod-like portion 28 is substantially straight, as shown, there is no appreciable wedging action of the tool against the shrimp body tending to force the shrimp body from the shell. Therefore it is necessary to cause the tool to move transversely of the shrimp so as to force the shrimp body from the shell. It will be seen that a movement of the handle of the tool toward the back of the shell will urge the rod-like portion 28 of the tool against that portion of the shrimp body between the sand vein and the back of the shrimp so as to sever that portion of the shrimp body, if initial insertion and movement of the tool along the sand vein has not already done so. Also, such lateral movement of the tool handle serves to move the forward end 29 and rod-like portion 28 away from the back of the shell so as to force the shrimp body out of the shell. In following this procedure, it is preferable to employ a tool having substantially rigid elongated portions 28 and 29 because of the force exerted on these parts during the transverse manipulation of the tool.

The cross sectional shape of the elongated portions 28 and 29 of the tool in Fig. 12 may vary. What has been illustrated in this figure is an extremely simple form of the tool so as to emphasize the wide utility of this process. It will be understood that a wide bottom surface on the rod-like portion will tend to facilitate removal of the shrimp body, since the tool will thereby have a greater bearing surface contacting the body of the shrimp. Also, a bent or arcuate, rather than straight, configuration of the elongated portions 28 and 29 of the tool will be preferable since the tool thereby tends better to follow the natural curvature of the sand vein of the shrimp.

While it is usually more advantageous to effect separation of the body from the shell after the shrimp has been decapitated, this is not essential and the method may be practiced upon a shrimp prior to decapitation. In that event it is, of course, necessary to remove the head from the meat in a subsequent operation.

It will be seen that I have provided an extremely simple and convenient method for removing the bodies of shrimp from their shells. By the use of my novel process shrimp can be cleaned in a fraction of the time heretofore required by conventional methods. This method of cleaning shrimp is extremely advantageous to restaurant owners and the like, who are required to clean large quantities of shrimp daily because of the time, money, and labor that may be saved by utilizing the present invention.

This application is a continuation in part of my copending application, Serial No. 96,699, filed June 2, 1949, is now Patent No. 2,552,450.

I claim:

1. The method of removing the body of a shrimp from the shell which comprises applying a force between the body of the shrimp and the back of the shell to force the body outwardly from the shell.

2. In a method of removing the body of a shrimp from the shell, the step of exerting a force lengthwise within the body of the shrimp along the sand vein thereof from the head end toward the tail.

3. The method of removing the body of a shrimp from the shell which comprises exerting a force lengthwise within the body of the shrimp adjacent the back of the shell from the head end toward the tail, and forcing the shrimp body outwardly from the shell.

4. In a method of removing the body of a decapitated shrimp from the shell, the steps of inserting an elongated tool in the shrimp and causing relative movement of said tool lengthwise within the shrimp along the sand vein thereof.

5. In a method of removing the body of a shrimp from the shell, the step of causing relative movement of an elongated tool lengthwise within the shrimp along the sand vein thereof from the head end toward the tail.

6. In a method of removing the body of a shrimp from the shell, the steps of inserting the free end of an elongated tool in the body of the shrimp at the sand vein thereof, and causing said tool to travel along the passageway containing the sand vein from the head end toward the tail to sever the back of the shrimp body between the sand vein and the back of the shell.

7. The method of removing the body of a shrimp from the shell which comprises the steps of severing the back of the shrimp body between the sand vein and the back of the shell, and forcing the shrimp body outwardly from the shell by a force applied between the body of the shrimp and the back of the shell.

8. The method of removing the body of a shrimp from the shell which comprises applying a force between the body of the shrimp and the back of the shell, severing the back of the shrimp body between the sand vein and the back of the shell, and forcing the shrimp body outwardly from the shell.

9. The method of removing the body of a shrimp from the shell which comprises the steps of exerting a force lengthwise within the body of the shrimp along the sand vein thereof, and exerting a force to sever the back of the shrimp body between the sand vein and the back of the shell.

10. The method of removing the body of a shrimp from the shell which comprises the steps of exerting a force lengthwise within the body of the shrimp along the sand vein thereof, severing the back of the shrimp body between the sand vein and the back of the shell, and forcing the shrimp body outwardly from the shell.

11. The method of removing the body of a shrimp from the shell which comprises the steps of causing relative movement of an elongated tool lengthwise within the shrimp along the sand vein thereof, and exerting by said movement of the tool a force to sever the back of the shrimp body between the sand vein and the body of the shell.

12. The method of removing the body of a shrimp from its shell which comprises concurrently applying a force to rupture the back of the body to remove the sand vein from the body and wedge the body of the shrimp outwardly of the shell.

13. The method of cleaning a shrimp, comprising applying a force to the insides of the sand vein to rupture the back of the body of the shrimp to effect removal of the sand vein, and concurrently applying a force between the side walls of the passageway defining the sand vein in the body and the back of the shell to urge the body of the shrimp from between the sides of the shell and outwardly from the back of the shrimp.

14. The method of removing a body of a shrimp from its shell, which comprises progressively applying a wedging force between the back of the body and the back of the shell, from the head end of the shrimp to its tail, to wedge the body progressively from the shell.

15. The method of removing a body of a shrimp from its shell, which comprises progressively applying a wedging force to the side walls of the passageway defining the sand vein, in a direction from the head end of the shrimp to its tail, to rupture the back of the body and to force the body of the shrimp progressively outwardly from the shell.

16. The method of removing the body of a shrimp from the shell, which comprises the steps of exerting a force lengthwise within the body of the shrimp along the sand vein thereof and exerting a force to sever the back of the shell.

17. The method of removing the body of a shrimp from the shell, which comprises the steps of exerting a force within the body of the shrimp along the sand vein thereof and exerting a cutting force to sever the back of the shell.

18. The method of removing the body of a shrimp from the shell, which comprises the steps of causing relative movement of an elongated tool lengthwise within the shrimp along the sand vein thereof, and exerting by said movement of the tool a cutting force to sever the back of the shell.

19. The method of removing the body of a decapitated shrimp from the shell which comprises the steps of inserting an elongated tool into the sand vein, causing relative movement of the tool lengthwise within the shrimp in the direction of the sand vein thereof, and applying a force to the tool to cause that portion of the tool within the shrimp to move transversely of the longitudinal axis of the shrimp away from the back of the shell, so as to force the shrimp body outwardly from the shell.

STEPHEN ARTHUR PAOLI.

No references cited.